Patented June 10, 1941

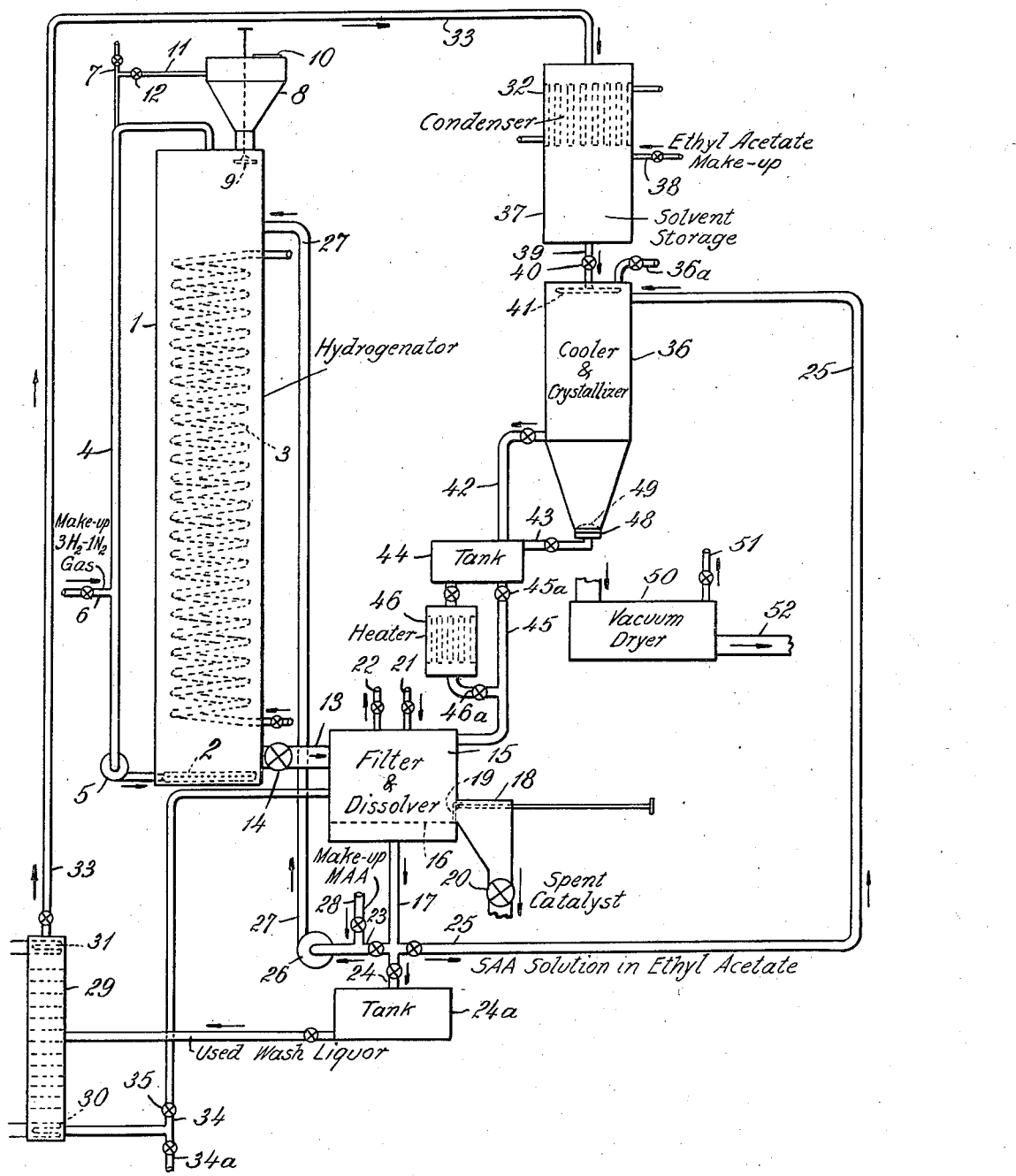

2,245,404

UNITED STATES PATENT OFFICE 2,245,404

MANUFACTURE OF SUCCINIC ANHYDRIDE

Mearl Alton Kise and Ralph Richter Wenner, Syracuse, N. Y., assignors to The Solvay Process Company, New York, N. Y., a corporation of New York Application February 3, 1939, Serial No. 254,402

6 Claims. (Cl. 260—341)

This invention relates to the manufacture of succinic anhydride by catalytic hydrogenation of maleic anhydride.

In the past it has been proposed to prepare succinic anhydride by vapor or molten phase hydrogenation of maleic anhydride. Both of these prior methods involved operating temperatures above the melting point of succinic anhydride. It also has been proposed to conduct the hydrogenation of maleic anhydride in solution at room temperature; for example, it has been proposed to hydrogenate maleic anhydride dissolved in about twenty times its weight of ethyl acetate using a nickel-kieselguhr catalyst.

The use of operating temperatures above the melting point of succinic anhydride is objectionable because of catalyst deterioration. The rate of catalyst deterioration rises as the hydrogenation temperature is elevated and even at temperatures as low as 125° to 135° C. a freshly prepared nickel-kieselguhr catalyst may be capable of serving for the hydrogenation of only about five times its weight or less of maleic anhydride.

The use of the solution phase process as formerly conducted is subject to the disadvantage that large quantities of solvent must be handled and correspondingly large capital outlays are required for apparatus of ample capacity. In the event it is desired to conduct the process at elevated pressures, the large size of the hydrogenator thus required is still more disadvantageous since the apparatus must be constructed to withstand much greater stresses than would be necessary for a smaller apparatus. The use of several small hydrogenators might be resorted to but here again the capital investment is substantially increased.

In accordance with the present invention the catalytic hydrogenation of maleic anhydride to succinic anhydride is conducted in liquid phase in the presence of solid succinic anhydride formed by the hydrogenation.

Since the process is conducted at temperatures below the melting point of succinic anhydride, it secures the advantage of low catalyst consumption. Since it does not require sufficient solvent to maintain the succinic anhydride in dissolved phase, the process permits the use of relatively high maleic anhydride concentrations, i. e. from 20% to 85% of maleic anhydride. As a consequence the apparatus required for the process is relatively small compared with that required for the prior art low temperature hydrogenation of maleic anhydride.

Preferably the process of the present invention is carried out with a maleic anhydride solvent such as ethyl acetate, isopropyl acetate, isoamyl acetate, dioxane, diethyl maleate, diethyl succinate, dimethyl maleate, dimethyl succinate, and the various isomeric propyl, butyl, and amyl acetates at hydrogenation temperatures maintained between 20° C. and 75° C.

The process may be conducted at ordinary atmospheric pressure but elevated pressures of at least 30 atmospheres absolute are preferred in veiw of the more rapid rate of hydrogenation at these pressures and their inhibitive effect upon vaporization of solvent and reactant.

The hydrogenation may be effected by means of hydrogen alone or hydrogen diluted with other gases such as nitrogen.

Any suitable hydrogenation catalyst may be employed such as the various reduced nickel catalysts of the prior art. The catalytic substance may be distended upon any of the conventional catalyst carriers that are inert with respect to reactants, for example pumice, asbestos, mineral wool, clay, kieselguhr, and the metallic carriers such as nickel.

It has been found in accordance with the present invention that solid succinic anhydride present in the hydrogenation mixture does not coat or otherwise impede the action of the catalyst. It has been found moreover that by suitable selection of the catalyst a very substantial separation of the solid succinic anhydride from catalyst may be effected by gravity. Thus, with a catalyst comprising 200 mesh kieselguhr coated and impregnated with between 14 and 18 weight per cent nickel, and having a density of about 2.4 grams per cubic centimeter, a reaction mixture comprising ethyl acetate solvent, maleic anhydride, and succinic anhydride may be agitated so as to maintain the catalyst uniformly suspended in the liquid while permitting settling out of succinic anhydride product. By operating in this manner it is possible to withdraw from the reaction vessel solid succinic anhydride containing a relatively small proportion of catalyst compared with the proportion present in the reaction zone itself. In order to secure the advantages of this separation and also to secure intimate contact between hydrogen gas and the reaction liquid, the process preferably is conducted in a vertically elongated apparatus such as a tower provided with means for introducing gas and for withdrawing the succinic anhydride near the bottom of the tower. Agitation of the mass may be effected either by means of mechanical agitators or by means of the gas bubbling up through the liquid.

To provide adequate agitation of the liquid by the gas flowing through it, it has been found desirable to recirculate a portion of the gas from the top of the tower back into the bottom. This recirculation provides the additional gas flow necessary for accelerating agitation and provides more effective and complete use of hydrogen without unduly extending the height of the treatment column.

Use of a normally liquid solvent such as ethyl acetate is advantageous in that it permits not only low operating temperatures but a broad range of operating temperatures. Thus a variation in temperature from 75° to 25° C. causes no serious change in physical condition of the reaction mixture, whereas without the ethyl acetate solvent a temperature drop of only about 7° C. from the preferred temperature would result in solidification of the entire reaction mixture.

After removal of succinic anhydride from the reaction zone, adhering liquid, if present in undesirable amount, may be filtered off. The anhydride may be dissolved in a suitable solvent, for instance hot ethyl acetate, and the solution may be filtered to separate it from solid catalyst; the resulting solution may be cooled to recrystallize and thus further purify the succinic anhydride. After washing adhering mother liquor from the succinic anhydride and drying, a product satisfactory for most commercial uses is obtained directly.

In the accompanying drawing is illustrated diagrammatically apparatus for carrying out the process of the invention in a system involving four major operations—hydrogenation, filtration, crystallization, and solvent purification (by distillation).

The hydrogenator is designated in the drawing by the numeral 1. As shown, it is preferably a tall tower (about 2.6 feet in diameter and about 15 feet tall) having near its base a distributor 2 for hydrogenating gas. Cooling means, such as coil 3, may be provided for removing heat of reaction from the contents of the hydrogenator. The tower should be constructed to withstand hydrogenation pressures on the order of 30 atmospheres and should be constructed of materials not attacked by the reactants under the conditions prevailing in the process. As shown in the drawing, the hydrogenator is arranged for recirculation of used hydrogenating gas and hence is provided with a return conduit 4 leading from the top of tower 1 to distributor 2 and having a blower 5 for inducing circulation. A make-up gas inlet 6 is arranged for continuously or intermittently introducing fresh hydrogenating gas. A bleed 7 is located on return conduit 4 for continuously or intermittently bleeding off a portion of the used gas.

At the top of the tower there is shown a closed hopper 8 having at its bottom a closure 9 and at its top a closure 10. The purpose of this hopper is to permit the addition of fresh catalyst without reducing the pressure in the hydrogenator. A pressure equalization line 11 having a suitable valve 12 is arranged for admitting gas from the bleed line 7 into the hopper 8 thus to elevate the pressure in the hopper to that in the hydrogenator. If desired, an exhaust outlet provided with a suitable valve (not shown) may be arranged on the hopper for releasing pressure therefrom.

At the base of the tower there is arranged an outlet conduit 13 having a valve 14. Conduit 13 should be designed for the conveyance of a heavy slurry of solid succinic anhydride in a liquid maleic succinic anhydride mixture or in a solution of succinic and maleic anhydrides in a solvent such as ethyl acetate.

A filter 15, which may be of any suitable type and is shown in the drawing merely as a tank having a stationary filtering membrane 16, is arranged to receive slurry from conduit 13. An outlet pipe 17 leads off from below the filter membrane. A side outlet 18 is disposed above the filter membrane 16 for removal of solid material. This outlet may be in the form of a hopper. A rake 19 or other means for removing solid from the filter may be permanently located within the filter tank and provided with means for operating it from outside so that actual opening of the tank or exposure of its contents to air is unnecessary except for replacement of the filter diaphragm, cleaning, repairing, and similarly infrequent operations. A star-valve 20 or other suitable device may be provided to permit removal of the filter residue, principally spent catalyst and adhering liquid, from the system. For conveying liquids to and from the filter tank it is provided with valve-controlled pressure inlet 21 and relief outlet 22. Outlet pipe 17 leads from the filtrate side of the filter to three valve-controlled conduits 23, 24, and 25.

Conduit 23 connects with a pump 26 for returning maleic anhydride-succinic anhydride filtrate to tower 1 via a return conduit 27. An inlet 28 for make-up maleic anhydride is arranged on conduit 23.

Conduit 24 leads to a storage tank 24a and thence to a distillation and rectification column 29 having a heating element 30 at the bottom and cooling element 31 at the top. The distillation column is connected to condenser 32 by a vapor line 33. A conduit 34 having a valve 35 leads from the base of the column back to filter 15. This conduit should be capable of conveying a slurry of solid succinic anhydride and may advantageously have a valve-controlled outlet 34a.

Conduit 25 leads from outlet conduit 17 to the top of a cooler and crystallization vessel 36 which may be a conventional type of crystallizer. It may have a valve-controlled outlet 36a leading to a vacuum pump and condenser (not shown) for reducing pressure in the crystallizer and thus effecting cooling of its contents by evaporation of ethyl acetate therefrom.

As illustrated the base of condenser 32 referred to above is enlarged to provide a storage tank 37 for solvent. This tank has an inlet pipe 38 for adding make-up solvent and an outlet conduit 39 controlled by a valve 40. Crystallizer 36 may be provided with a sprayhead 41 joined to conduit 39 and disposed to distribute solvent uniformly over solid matter contained in the crystallizer. Outlet conduits 42 and 43, respectively, lead off from the crystallizer for decanting and draining crystals collected therein. They may lead to a storage tank 44. The tank is connected directly via a conduit 45 back to filter tank 15 and indirectly via heat exchanger 46 thereto. Valves 45a and 46a permit regulation of flow through the two paths in the desired proportions so that the temperature of the liquid returned to filter 15 may be accurately and easily controlled. Any suitable arrangement may be provided for removing crystals from the crystallizer 36, e. g. removable plate 48, and sieve 49. Vacuum drier 50, into which crystals in crystallizer 36 may be dropped by removing plate 48 and sieve 49, may be of any suitable type for drying crystals without exposure to air and may be provided with outlet 51 for application of suction and outlet 52 for recovery of succinic anhydride product.

The following description illustrates the operation of the above apparatus for hydrogenation of maleic anhydride in ethyl acetate solvent by means of a nitrogen-hydrogen gas having an initial content of about 75% hydrogen and 25% nitrogen by volume. The catalyst employed may be a 14%–20% reduced nickel catalyst carried by kieselguhr and may be prepared by impregnating 100-mesh or finer kieselguhr with nickel nitrate solution, adding a solution of ammonium carbonate, separating the resulting sludge from liquid, drying the sludge, and heating it in hydrogen at a temperature between 450° and 500° C.

For the production of about 2000 pounds of succinic anhydride per 24-hour day, the hydrogenator may be charged initially with about 3500 pounds of a mixture composed of 85% maleic anhydride and 15% ethyl acetate containing about 70 pounds of the reduced nickel catalyst. The temperature of the mixture may be from 20° to 55° C. or more, the higher temperatures accelerating the hydrogenation. The hydrogenating gas mixture, containing 75% of hydrogen, 25% nitrogen, and free from oxygen, sulfur and water, is then introduced through inlet 6, and by means of blower 5 caused to circulate up through the hydrogenator and back through conduit 4 and distributing ring 2 to the hydrogenator. During this operation valves 9 and 14 and that on line 7 are closed. The pressure within the hydrogenator thus builds up until it approximates that of the hydrogen supply, say about 30 atmospheres.

The maleic anhydride, if originally introduced at a lower temperature, is gradually warmed by the hydrogenation taking place therein to about 55° C. and thereafter is maintained at about this temperature by suitable regulation of the cooling medium in the cooling coil 3. When the desired operating pressure has been attained, the valves on inlet 6 and outlet 7 are adjusted so as to provide a substantially constant pressure and also a substantially constant concentration of hydrogen of about 50% based on the total volume of fixed gas at the outlet. The hydrogenation is continued in this manner until about 1950 pounds of the maleic anhydride have been hydrogenated to succinic anhydride.

During the hydrogenation period the catalyst hopper 8 may be charged with about eight pounds of fresh catalyst and brought to the pressure of the hydrogenator by opening valve 12.

Valve 14 is now opened and sufficient slurry is permitted to pass into filter tank 15 to fill this tank. The slurry may contain around 650 to 670 pounds of solid succinic anhydride which, because of its density, forms the major part of the mixture at the bottom of the hydrogenator, and around 300 pounds of solution of maleic and succinic anhydrides in ethyl acetate containing perhaps 7 or 8 pounds of catalyst. The amount withdrawn may depend upon the cycle period. Thus if the process is conducted on the basis of one cycle per day larger quantities may be removed, and if on the basis of one cycle per hour, much smaller. The number of cycles most satisfactory is a question of economic balance which may be different for different localities. When the filter is full, valve 14 is closed and the solution of maleic and succinic anhydrides in ethyl acetate is allowed to filter through diaphragm 16 and to pass out through outlet conduit 17 whence it is pumped by pump 26 back into the hydrogenator.

It will be noted that with the system shown, it is necessary either to pump the solution against a head of more than 29 atmospheres or else to build up pressure in the filter tank 15 by opening the valve on pressure connection 21 until the pressure in the filter corresponds approximately to that in the hydrogenator. Alternatively the filtrate may be run into a collecting tank (not shown) and then pumped at ordinary or elevated pressure from the collecting tank back to the hydrogenator. At the same time that filtrate is being returned to the hydrogenator, maleic anhydride corresponding to the quantity of succinic anhydride separated in the filter may be added through inlet 28 and valve closure 9 may be opened to permit addition to the hydrogenator of the charge of catalyst in hopper 8. When these additions have been accomplished, the valves on lines 23 and 28 are closed, valves 9 and 12 are closed, and a new period of hydrogenation is begun. The solution in the hydrogenator will now consist of about 50% maleic anhydride, 15% dissolved succinic anhydride, and 35% ethyl acetate together with a small percentage of succinic anhydride dispersed in solid phase along with the catalyst dispersion. If the maleic anhydride added is at room temperature, it may cool the solution in the hydrogenator about 5 or 10 degrees. Hence the temperature of the hydrogenator may be permitted to rise, toward the end of each period, sufficiently to compensate or partly compensate for this cooling effect.

It will be evident from the foregoing discussion that after the initial period of operation, the succinic anhydride content is above that of a saturated solution throughout the hydrogenation and the succinic anhydride will be precipitated from the solution at practically the same rate as that at which it is formed, minor variations from this constant relation being introduced by incidental variations in temperature.

Operating with a hydrogenation mixture of the above-described composition maintained at about 55° C., it has been found that only about 1.2 pounds of catalyst are required per 100 pounds of succinic anhydride produced.

When nearly all the maleic anhydride, ethyl acetate solvent mixture has been drained from the solid succinic anhydride in filter 15, the solid material on the filter is washed with about 1100 pounds of a solution of 10% succinic anhydride in ethyl acetate at a temperature of about 30° C. to remove residual solvent mixture. The resulting wash liquor is permitted to pass through conduit 24 into a storage tank 24a and thence into distillation column 29 where it is distilled to separate the ethyl acetate from succinic anhydride and maleic anhydride. A small portion of it may be passed into the hydrogenator to make up ethyl acetate losses therefrom. The distillation in column 29 may be conducted to such an extent that the distillation residue comprises a slurry of about equal parts liquid and succinic anhydride solid. The residue may be maintained temporarily in the bottom of the distillation vessel. Distillate from column 29 passes to condenser 32 where it is condensed and collected in the storage section 37.

When the wash liquor has drained from the filter residue, the latter is flooded with hot ethyl acetate (containing about 10% succinic anhydride in solution) to dissolve the succinic anhydride in the filter residue and form a solution at a temperature of about 75° C. approximately saturated with succinic anhydride. This solution is conveyed by conduits 17 and 25 to crystallizer 36. Solid remaining in filter tank 15 comprises the catalyst drawn off with the succinic anhydride slurry from the hydrogenator. This may be allowed to accumulate on the filter until a sufficient quantity has been deposited to warrant its removal or it may be removed at each period of operation.

The succinic anhydride solution conveyed to crystallizer 36 is cooled therein from 75° C. to 30° C. by adiabatic vacuum evaporation of a part of the ethyl acetate; succinic anhydride is thus caused to crystallize out. When crystallization is completed, mother liquor may be withdrawn to storage tank 44 and the product may be washed with ethyl acetate from solvent storage chamber 37. The washed crystals after draining are transferred to drier 50 and dried in vacuo, after which they are suitable for sale or use.

The mother liquor drained from the succinic anhydride crystals may be employed as washing liquid for a succeeding batch of succinic anhydride in filter 15. The balance of the mother liquor together with the wash liquor may be employed for dissolving the succinic anhydride in filter 15. If this sequence of operations is employed, the wash liquor and solvent liquor employed for treating the solid succinic anhydride both will be saturated with succinic anhydride at 30° C. Hence, if the washing operation is conducted at 30° C. no loss of solid succinic anhydride by solution will take place. Similarly no loss will take place in the crystallizer as a result of solution in the ethyl acetate employed for dissolving the succinic anhydride. Around 4000 pounds of about 10% succinic anhydride solution in ethyl acetate may be employed for dissolving 650 to 700 pounds of succinic anhydride. Upon crystallization of the succinic anhydride, mother liquor amounting to around 4000 pounds is formed. About 1000 to 1100 pounds of this may be used for washing the next batch of succinic anhydride in filter 15, and the remainder is available for dissolving this batch of anhydride. The balance required to bring the total to the 4000 pounds may be obtained by washing the crystals in crystallizer 36 with around 1000 pounds of ethyl acetate and adding the resulting solution of succinic anhydride to the remaining mother liquor.

Earlier in the description of the process it was mentioned that a slurry of solid succinic anhydride in a solution of ethyl acetate, maleic anhydride, and succinic anhydride is formed as distillation residue in the base of column 29. This slurry may be ejected from the base of the column back into filter 15 before, during, or after a new batch of slurry has been introduced into the filter from hydrogenator 1. If desired a portion or all of the residue may be withdrawn from the system at 34a. Solid succinic anhydride may be separated by filtration or decantation and withdrawn as a crude product of relatively low purity compared with the final product recovered at 52, and residual liquid consisting for the most part of ethyl acetate and maleic anhydride (for instance, about 50 pounds of ethyl acetate, 35 pounds of maleic anhydride, and 5 pounds of succinic anhydride) may be returned to the hydrogenator or withdrawn and treated to recover its anhydride constituents. By withdrawing residue, impure succinic anhydride, or residual liquid, the building up of the impurity content of the solution in the hydrogenator may be prevented and the purity of the final succinic anhydride product may be correspondingly increased.

Ethyl acetate may be recovered from bleed gas and from drier vapor by suitable washing. Catalyst values may be recovered in conventional manner from the material discharged at 20.

The process may be operated continuously, i. e. with constant conditions in the hydrogenator, by continuously withdrawing slurry, continuously adding maleic anhydride and ethyl acetate, and continuously or substantially continuously adding fresh catalyst. The recovery system also may be of the continuous type by providing continuous filters, one for each step, and continuous washers, dissolver, crystallizer, and drier.

Whether the process involves cyclic operation of the hydrogenator or operation thereof under constant conditions, the introduction of hydrogen may be conducted continuously without interruption during removal of succinic anhydride. In fact, if the hydrogen is relied upon to provide the agitation during the reaction, it is desirable in many cases not to interrupt the flow thereof since such interruption would permit the settling of catalyst into the succinic anhydride being removed and if prolonged would increase the proportion of catalyst withdrawn from the hydrogenator with the final product. Since the process usually involves the exhaustion of catalyst to a point beyond which its use is impractical at a rate on the order of one pound of catalyst per one hundred of succinic anhydride, it may be advantageous to control the flow of hydrogen during removal of succinic anhydride so as to effect withdrawal of approximately this proportion of catalyst along with the succinic anhydride. The extent of such control will of course depend upon the density and particle size of the catalyst employed. For instance, with some catalysts whose rate of fall is relatively high this proportion may be equalled or exceeded without interrupting the agitation. With slower falling catalysts on the other hand the process may be interrupted to effect settling of substantially larger quantities of succinic anhydride than set forth in the specific example above without the removal of this proportion of catalyst.

We claim:

1. The method of making solid succinic anhydride, which comprises subjecting a solution of maleic anhydride in an organic solvent, said solution being saturated with succinic anhydride, to catalytic hydrogenation so as to precipitate succinic anhydride from the solution at the rate at which it is formed, and separating precipitated succinic anhydride from the solution.

2. The method of making solid succinic anhydride, which comprises bubbling gaseous hydrogen through a body of maleic anhydride solution saturated with succinic anhydride and containing a solid hydrogenation catalyst having a rate of fall in the solution less than that of succinic anhydride formed in situ, whereby solid succinic anhydride is precipitated from the solution at the rate at which it is formed therein, causing the solid succinic anhydride thus precipitated to settle and form in the lower part of the hydrogenator a slurry containing a higher ratio of solid succinic anhydride to catalyst than present in the higher part of the hydrogenator, and removing the settled solid from the hydrogenator while retaining the major portion of solution and catalyst therein.

3. The method of making solid succinic anhydride, which comprises bubbling gaseous hydrogen through a body of maleic anhydride solution saturated with succinic anhydride and containing a solid hydrogenation catalyst composed of not coarser than 100-mesh kieselguhr containing between 14% and 20% nickel, whereby solid succinic anhydride is precipitated from the solution at the rate at which it is formed therein, agitating the solution mildly so as to permit solid succinic anhydride to settle while maintaining the catalyst substantially uniformly distributed thereby forming in the lower part of the hydrogenator a slurry containing a higher ratio of solid succinic anhydride to catalyst than present in the higher part of the hydrogenator, and removing the settled solid from the hydrogenator while retaining the major portion of solution and catalyst therein.

4. The method of making a solid succinic anhydride, which comprises subjecting a solution of maleic anhydride in an organic solvent, said solution being saturated with succinic anhydride, to catalytic hydrogenation so as to precipitate succinic anhydride from the solution at the rate at which it is formed, separating precipitated succinic anhydride from the solution and purifying it by recrystallization.

5. The method of making solid succinic anhydride, which comprises subjecting an ethyl acetate solution of maleic anhydride saturated with succinic anhydride to catalytic hydrogenation so as to precipitate succinic anhydride from the solution at the rate at which it is formed, separating succinic anhydride precipitate from the solution, washing it with ethyl acetate to remove residual solution, dissolving the washed succinic anhydride in hot ethyl acetate, cooling the solution to crystallize the succinic anhydride, and separating the crystallized succinic anhydride from the resulting mother liquor.

6. The method of making solid succinic anhydride, which comprises bubbling gaseous hydrogen through a body of an ethyl acetate solution of maleic anhydride saturated with succinic anhydride and containing a solid hydrogenation catalyst having a rate of fall in the solution less than that of succinic anhydride formed in situ, whereby solid succinic anhydride is precipitated from the solution at the rate at which it is formed therein, causing the solid succinic anhydride thus precipitated to settle and form in the lower part of the hydrogenator a slurry containing a higher ratio of solid succinic anhydride to catalyst than present in the higher part of the hydrogenator, removing the settled solid succinic anhydride from the hydrogenator while maintaining the major portion of solution and catalyst therein, washing the solid succinic anhydride with ethyl acetate to remove residual solution, dissolving the washed succinic anhydride in hot ethyl acetate, cooling the resulting solution to crystallize succinic anhydride therefrom, and separating the succinic anhydride crystals from the resultant mother liquor.

MEARL ALTON KISE.
RALPH RICHTER WENNER.